Jan. 29, 1963  N. E. DESENBERG  3,075,259
DOUBLE ARMING CONNECTION BOX
Filed July 25, 1960  2 Sheets-Sheet 1
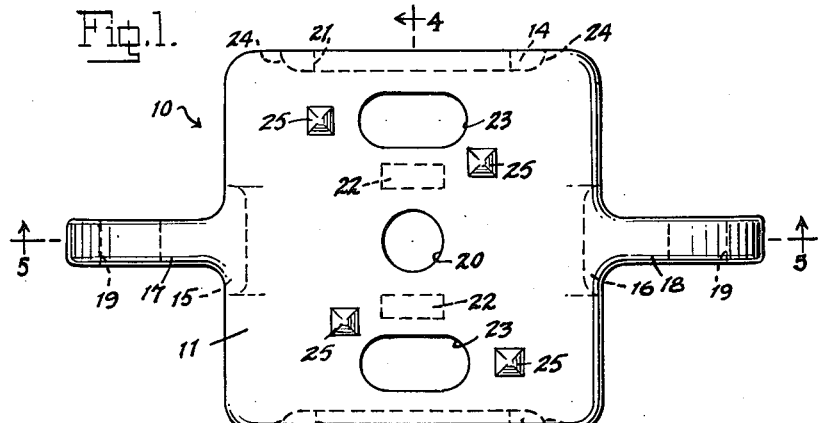
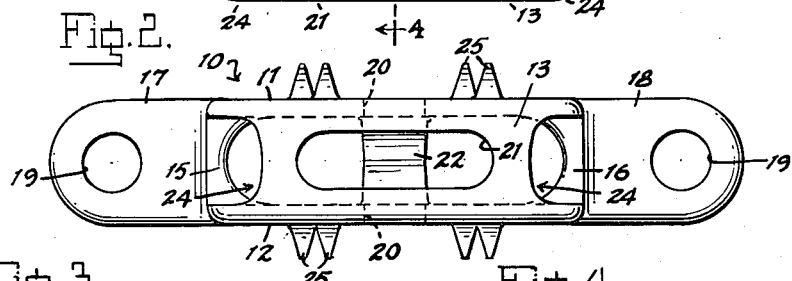
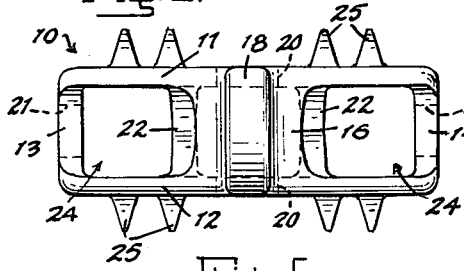
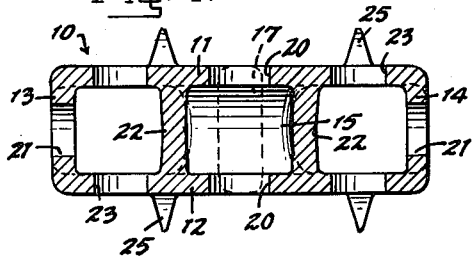
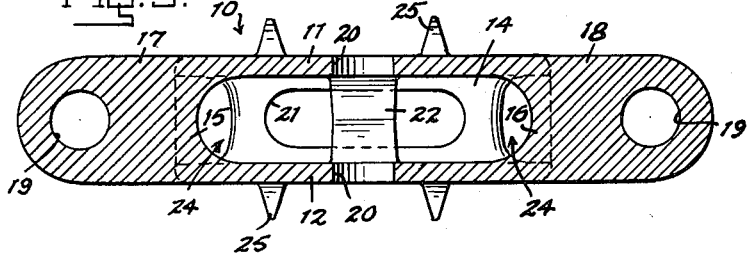
INVENTOR.
NED E. DESENBERG
BY
ATTORNEY.

Jan. 29, 1963 N. E. DESENBERG 3,075,259
DOUBLE ARMING CONNECTION BOX
Filed July 25, 1960 2 Sheets-Sheet 2
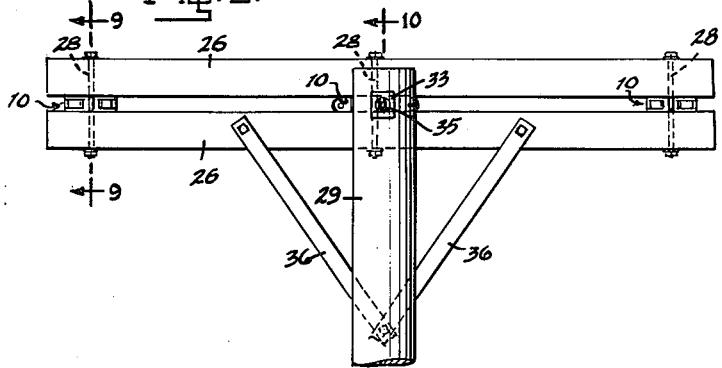
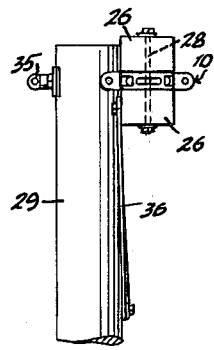
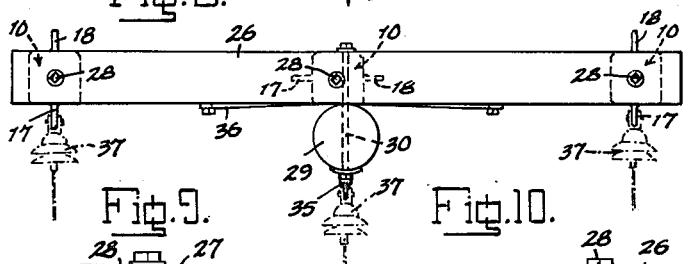
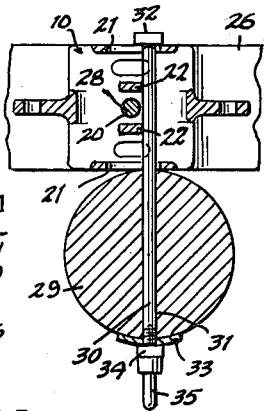
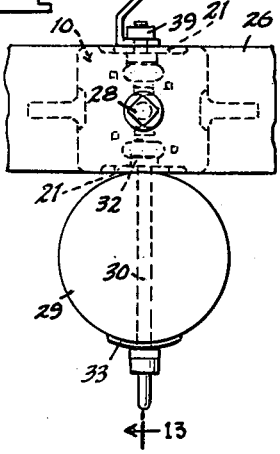
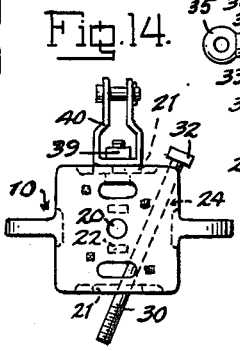
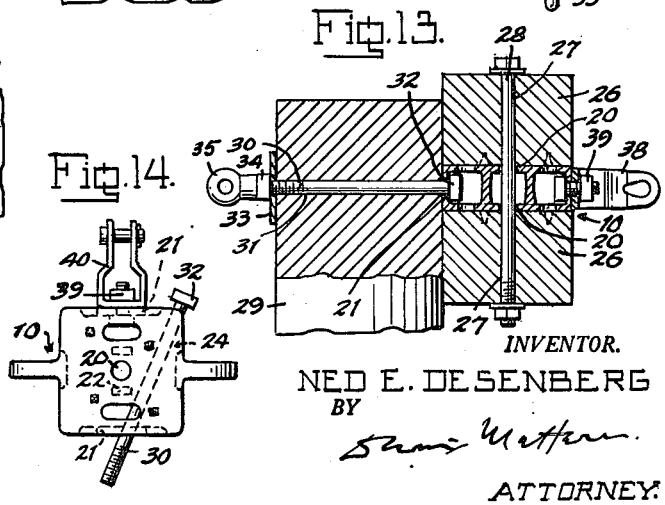
INVENTOR.
NED E. DESENBERG
BY
ATTORNEY.

United States Patent Office 3,075,259
Patented Jan. 29, 1963

---

3,075,259
DOUBLE ARMING CONNECTION BOX
Ned E. Desenberg, Branford, Conn., assignor to Malleable Iron Fittings Company, Branford, Conn., a corporation of Connecticut
Filed July 25, 1960, Ser. No. 45,202
3 Claims. (Cl. 20—92)

The present invention relates to a double arming connection box, particularly for use with the pole mounted cross-arms of electrical transmission or distribution lines of the type commonly known in the industry as "double arm." Double arms are used for various applications but most commonly for dead ending horizontally where loads exceed the strength of a single arm with safety factor applied.

Heretofore double arm assemblies have been employed which included different special parts for respectively connecting the double arms together, for mounting the double arms upon the pole, and for the connection of line suspension insulators or other associated hardware. An object of the invention is to provide a connection box unit which may be provided in suitable numbers to connect the two crossarms of the double arm assembly together, one unit for instance being placed substantially centrally and one adjacent each end, and each unit including means for receiving a tie-bolt for connecting the double arms together, means for receiving a through-bolt for connecting the double arm assembly to a pole, and means for the connection of line suspension insulators or other associated hardware.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a top plan view of a double arm connection box according to the invention;

FIG. 2 is a side elevation as seen from below in FIG. 1;

FIG. 3 is a side elevation as seen from the right in FIG. 1;

FIG. 4 is a sectional view taken along the line 4—4 of FIG. 1;

FIG. 5 is a sectional view taken along the line 5—5 of FIG. 1;

FIG. 6 is a side elevation of the upper end of a transmission or distribution line pole having a double crossarm assembly mounted thereon and provided with connection box units according to the invention;

FIG. 7 is an end view as seen from the right in FIG. 6;

FIG. 8 is a top plan view;

FIG. 9 is a vertical sectional view on an enlarged scale, taken along the line 9—9 of FIG. 6;

FIG. 10 is a vertical sectional view, also on an enlarged scale, taken along the line 10—10 of FIG. 6;

FIG. 11 is a horizontal sectional view taken along the line 11—11 of FIG. 10;

FIG. 12 is a fragmentary top plan view showing a modified arrangement of the through-bolt connecting the cross-arm to the pole, and also showing a dead end tongue connected to the connection box unit;

FIG. 13 is a vertical sectional view taken along the line 13—13 of FIG. 12; and

FIG. 14 is a plan view of the connection box unit showing the manner in which a through-bolt is engaged therewith to position it according to the modified arrangement as seen in FIGS. 12 and 13, and also showing a dead end clevis connected thereto.

Referring now to the drawings and more particularly to FIGS. 1–5, the double arming connection box 10, according to the exemplary embodiment of the invention illustrated therein, is preferably in the form of a malleable iron casting and comprises spaced parallel rectangular top and bottom walls 11 and 12 connected at two of their opposite side edges by side walls 13 and 14 and connected at their other two opposite side edges by side walls 15 and 16 from which longitudinally aligned eye-lugs 17 and 18 project. A hole 19 is provided in each of the eye-lugs 17 and 18 for accepting the connector of clevis and eye type disk insulators or associated hardware, as will hereinafter more fully appear.

The top and bottom walls 11 and 12 are provided centrally with vertically aligned tie-bolt receiving holes 20—20 and the side walls 13 and 14 are provided with horizontally aligned elongated through-bolt receiving slot openings 21—21. As seen in FIGS. 2 and 5 the horizontal through-bolt receiving passage provided by the slot openings 21 extends an equal distance at each side of the vertical tie-bolt receiving passage provided by the holes 20, for the purpose of allowing a through-bolt to be engaged through the slot openings 21 at either side of a tie-bolt engaged through the holes 20.

A pair of vertical posts 22—22 connect the top and bottom walls at points between the holes 20 and the side walls 13 and 14. In addition to providing reinforcing struts between the top and bottom walls the posts position the horizontal through-bolt engaged through the slots 21 out of contact with the vertical tie-bolt engaged through the holes 20 and restrain horizontal movement of the box with respect to the through-bolt. Elongated holes 23 may be provided at suitable positions in the top and bottom walls 13 and 14 to reduce weight.

The side walls 13 and 14 as well as the side walls 15 and 16 terminate short of the corners of the top and bottom walls, and thus provide corner openings 24 which are so angled with respect to the posts 22 and the slot openings 21 in the side walls 13 and 14 that a headed through-bolt may be passed through any one of these corner openings to engage in the slot opening 21 of the opposite side wall with its head in engagement with the inner side of such side wall. It is pointed out that the vertical spacing of the top and bottom walls 11 and 12 is sufficiently greater than the width of the through-bolt head to allow free passage of the head between the top and bottom walls while at the same time restraining the head from turning as the nut of the through-bolt is tightened. This enables an alternate arrangement of the through-bolt with its head internally of the connection box and centrally aligned with the tie-bolt engaged through the openings 20, as distinguished from the assembly where the through-bolt is engaged through the slot openings of both of the side walls 13 and 14 and extends through the box in offset relation to the tie-bolt.

Suitably positioned spurs 25 are provided upon the top and bottom walls for the purpose of imbedding into the crossarms to help transfer the loads, and strengthen and add stability to the connection.

As seen in FIGS. 6–11 the two crossarms 26—26 comprising the double arm crossarm have three of the connection boxes according to the invention interposed, one substantially at the middle and one adjacent to each end. Vertical holes 27 pre-drilled through the crossarms are aligned with the center holes 20 of the connection boxes and tie-bolts 28 are engaged through the holes 27 and 20 to tie the two crossarms together, tightening of the tie bolts causing the spurs 25 of the connection boxes to imbed into the crossarms.

The middle connection box is positioned with the eye-lugs 17 and 18 disposed longitudinally of the crossarms and with the side walls 13 and 14 parallel and substantially flush with the forward and rearward sides of the crossarms, and serves as a connection fixture for securing the crossarm assembly upon the vertical pole 29. The through bolt 30 is passed through the slot openings 21 of the side walls 13 and 14 in offset relation to the tie bolt 27 and thence through a pre-drilled diametric hole 31 in the pole. The head 32 of the bolt abuts the outer side wall and its threaded end is engaged through a washer plate 33 seated against the side of the pole opposite from the crossarm, a tightening nut 34 being screwed upon the projecting threaded end of the through bolt and an eye-nut 35 being screwed upon the threaded end against the nut 34. Diagonal brace bars 36 are connected between the crossarm and the pole.

The connection boxes adjacent the ends of the crossarm are turned 90° with respect to the middle connection box so that the eye-lugs 17 and 18 are transverse of the crossarm. As shown by the dot-and-dash lines in FIG. 8, line suspension insulators 37 are connected to the eye-lugs at one side of the connection boxes adjacent the ends of the crossarm and to the eye nut 35 upon the through-bolt 30. This is a typical dead ending arrangement with the double arm crossarm at the far side of the pole from the line connections, but it will be understood that the invention is adaptable to other arrangements. For instance, lines may be connected to the eye-lugs of the end connector boxes at each side and the through-bolt 30 may have eye-nuts provided upon both ends for the connection of lines at each side. Additionally, the connection boxes may have various types of line connecting hardware connected thereto, as will presently more fully appear.

In FIGS. 12-14 there is shown an alternate arrangement of the through-bolt 30 wherein the head 32 is internally disposed and the through-bolt is centered with respect to the tie-bolt 27. As shown in FIG. 14 the through-bolt in this case has its head passed between the top and bottom walls of the connection box by inserting the bolt diagonally through one of the corner openings 24 and through the slot opening 21 in the opposite side wall, the head moving through the box clear of the tie-bolt 27 and the posts 22, and its head 32 being thereupon positioned against the inner side of the side wall in centered alignment with the tie-bolt.

As seen in FIGS. 12 and 13 a dead end tongue 38 of conventional type may be secured upon the outer side wall of the connection box by a bolt 39 engaged through the slot opening 21 of the side wall. As seen in FIG. 14 a conventional type of dead end clevis 40 is similarly secured by a bolt 39 engaged through the slot opening of the outer side wall. Similarly the connection boxes adjacent the ends of the crossarms may have such line connecting hardware connected thereto, either with the eye-lugs in the transverse position as seen in FIGS. 6-11 or with the connection boxes turned 90° to dispose the eye-lugs longitudinally of the crossarm.

What is claimed is:

1. A connection box of the character described, comprising vertically spaced parallel rectangular top and bottom walls each having centrally disposed tie-bolt receiving hole vertically aligned one with the other for receiving a vertical tie-bolt each of a width to position a tie-bolt against horizontal displacement, a first pair of horizontally opposed parallel side walls respectively at opposite sides of said tie-bolt receiving holes and each having a through-bolt receiving slot opening horizontally aligned one with the other and of a length substantially greater than the width of said tie-bolt receiving holes with their ends horizontally offset outwardly an equal distance with respect to said tie-bolt receiving holes for receiving a horizontal through-bolt extending between said side walls in horizontally offset relation to and at either side of a vertical tie-bolt received in said tie-bolt receiving holes and of a width less than the vertical spacing of said top and bottom walls whereby said side walls are adapted to be engaged at their inner sides by the head of a through-bolt, and a second pair of horizontally opposed parallel side walls respectively at opposite sides of said tie-bolt receiving holes and disposed at right angles to said first side walls, said first and second pairs of side walls terminating in spaced relation to the corners of said top and bottom walls to provide entrance openings defined by the inner sides of said top and bottom walls and by the ends of said side walls for receiving the head of a through-bolt between said top and bottom walls.

2. A connection box of the character described, comprising vertically spaced parallel top and bottom walls each having a tie-bolt receiving hole vertically aligned one with the other for receiving a vertical tie-bolt, a first pair of horizontally opposed side walls respectively at opposite sides of said tie bolt receiving holes and each having a through-bolt receiving slot opening horizontally aligned one with the other for receiving a horizontal through-bolt extending between said side walls in horizontally offset relation to a vertical tie-bolt received in said tie-bolt receiving holes, a second pair of horizontally opposed side walls respectively at opposite sides of said tie-bolt receiving holes and disposed at right angles to said first side walls, and a pair of outwardly projecting eye-lugs respectively integral with said second pair of side walls.

3. A connection box of the character described, comprising vertically spaced parallel rectangular top and bottom walls each having a centrally disposed tie-bolt receiving hole vertically aligned one with the other for receiving a vertical tie-bolt, a first pair of horizontally opposed side walls respectively at opposite sides of said tie-bolt receiving holes and each having a through-bolt receiving slot opening horizontally aligned one with the other and each extending an equal distance at each side of a central vertical plane coincident with the axes of said tie-bolt receiving holes for receiving a horizontal through-bolt extending between said side walls in horizontally offset relation to a vertical tie-bolt received in said tie-bolt receiving holes, post means connected between said top and bottom walls between said tie-bolt receiving holes and said side walls for positioning said through-bolt out of contact with said tie-bolt, a second pair of horizontally opposed side walls respectively at opposite sides of said tie-bolt receiving holes and disposed at right angles to said first side walls, said first and second pairs of side walls terminating in spaced relation to the corners of said top and bottom walls to provide entrance openings for receiving the head of a through-bolt between said top and bottom walls, a pair of outwardly projecting eye-lugs respectively integral with said second pair of side walls, and projecting spurs upon the outer faces of said top and bottom walls.

References Cited in the file of this patent

UNITED STATES PATENTS 44,397    Chapin _____ Sept. 27, 1864